Jan. 6, 1948.  V. E. PRATT ET AL  2,433,923
LOCKING MEANS FOR INDICATING INSTRUMENTS
Filed June 20, 1944   3 Sheets-Sheet 1

INVENTOR.
VERNEUR E. PRATT
GEORGE F. GRAY
BY

ATTORNEYS

Jan. 6, 1948.    V. E. PRATT ET AL    2,433,923
LOCKING MEANS FOR INDICATING INSTRUMENTS
Filed June 20, 1944    3 Sheets-Sheet 2

INVENTOR.
VERNEUR E. PRATT
GEORGE F. GRAY
BY
Van Deventer & Grier
ATTORNEYS

Jan. 6, 1948.  V. E. PRATT ET AL  2,433,923
LOCKING MEANS FOR INDICATING INSTRUMENTS
Filed June 20, 1944  3 Sheets-Sheet 3
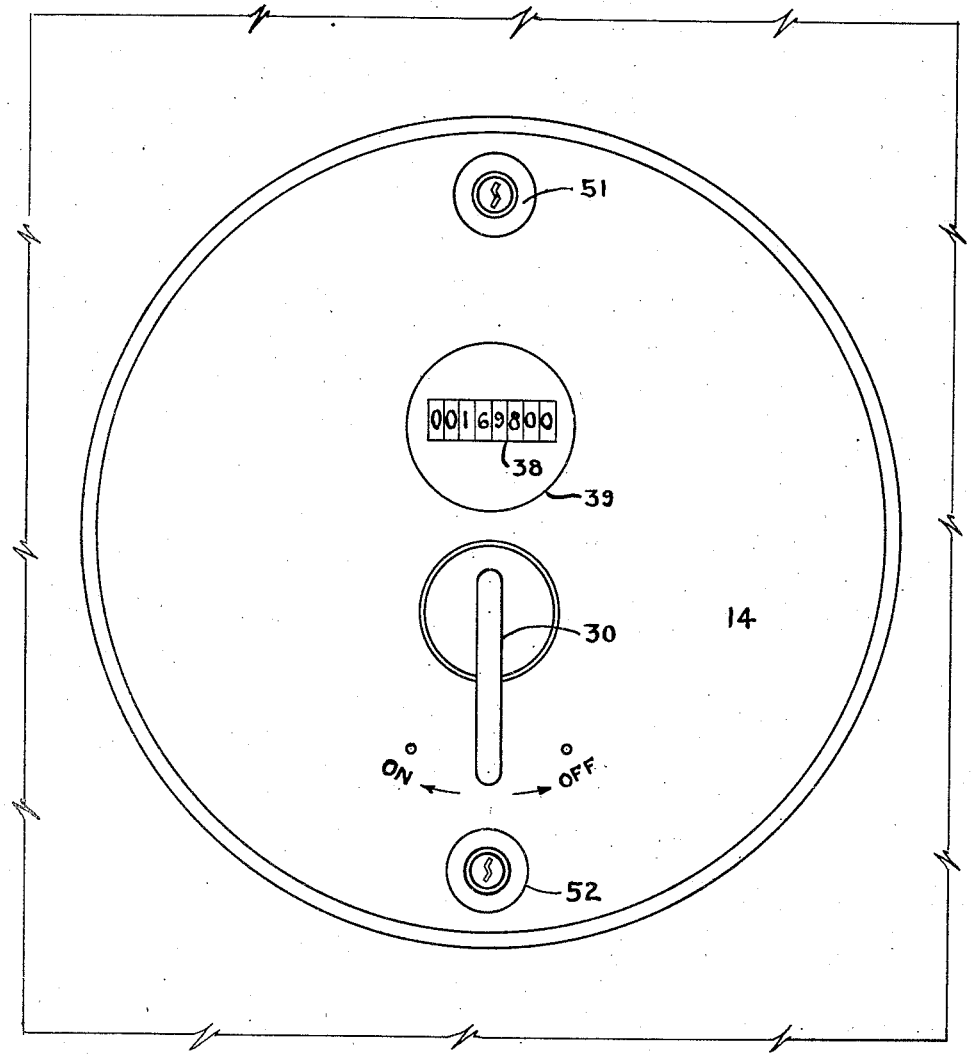
INVENTOR.
VERNEUR E. PRATT
BY GEORGE F. GRAY
ATTORNEYS Patented Jan. 6, 1948

2,433,923

UNITED STATES PATENT OFFICE 2,433,923

LOCKING MEANS FOR INDICATING INSTRUMENTS

Verneur E. Pratt and George F. Gray, Norwalk, Conn.

Application June 20, 1944, Serial No. 541,192

10 Claims. (Cl. 73—432)

This invention relates to indicating instruments. In many instances where machines are leased in consideration of a payment per piece of product made thereon, or for a royalty per operation, or where a meter is used to measure gas, electricity, or the like, some form of indicating instrument is used—such as a counter, kilowatt hour or cubic foot meter, et cetera. Such instruments are hereinafter generally termed "instrument" or "indicator." They must be read periodically in order to compute the payments due.

Such readings necessitate a visit to the instrument. The frequency of such visits depends upon the capacity of the instrument. For example, a machine on which a counter is employed having a capacity up to 1,000,000 must be visited to reset the counter before it records 1,000,000 operations, or it may run over and fail to record any number above 1,000,000.

The lessor usually takes the readings. If he relies upon the lessee, disputes arise as to the accuracy of the reports. Unauthorized persons may attempt to change the reading.

An object of the invention is to provide an instrument of the class described which need not be visited by the lessor, but can be taken off a machine or disconnected from a gas or electric main and sent to the lessor while it is replaced by another instrument furnished by the lessor, who therefore can inspect and repair the returned instrument at less expense than when other types of instruments are used.

Another object is to provide an instrument of the class described which is so arranged, constructed and combined with the machine with which it is associated that the lessee cannot change the instrument reading nor use the machine unless an instrument furnished by the lessor is associated therewith.

Other objects will be apparent from the following specification, taken in connection with the accompanying drawings, where by way of illustration a counter is shown as applied to a machine to count each cyclic operation thereof, as for example, a photographic printer in which, as each print is made, the counter is advanced one digit. The printer is not shown in detail as any suitable machine with which a counter is employed may be used, the device herein described being readily applicable to any machine with but minor changes readily apparent to one skilled in the art when in possession of the inventive concept herein disclosed.

In the accompanying drawings:

Figure 3 is a front view of the device, Figure 1; and

Figure 1:
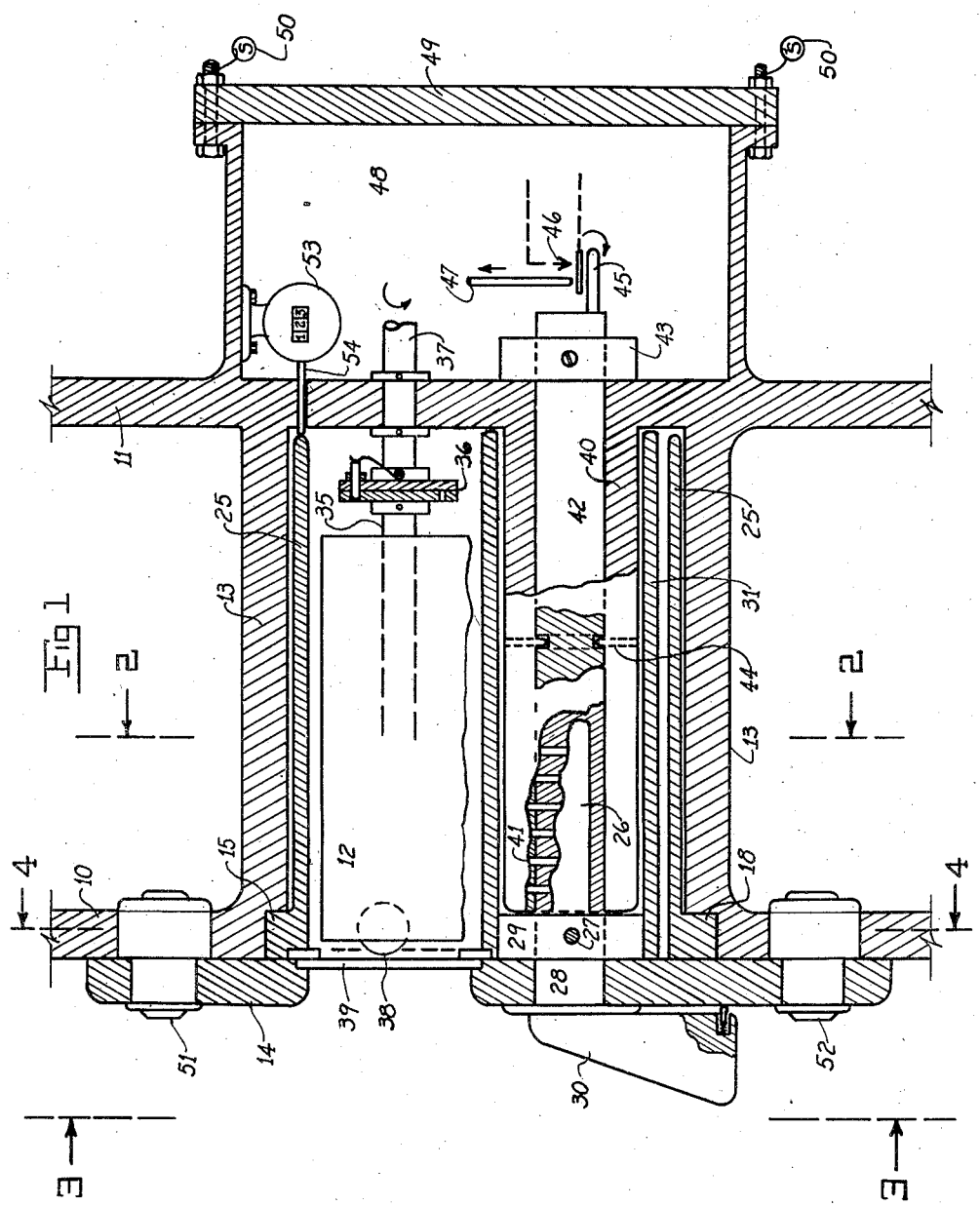
Figure 1 is a horizontal longitudinal view partly in section of a device embodying the invention.
Figure 2:
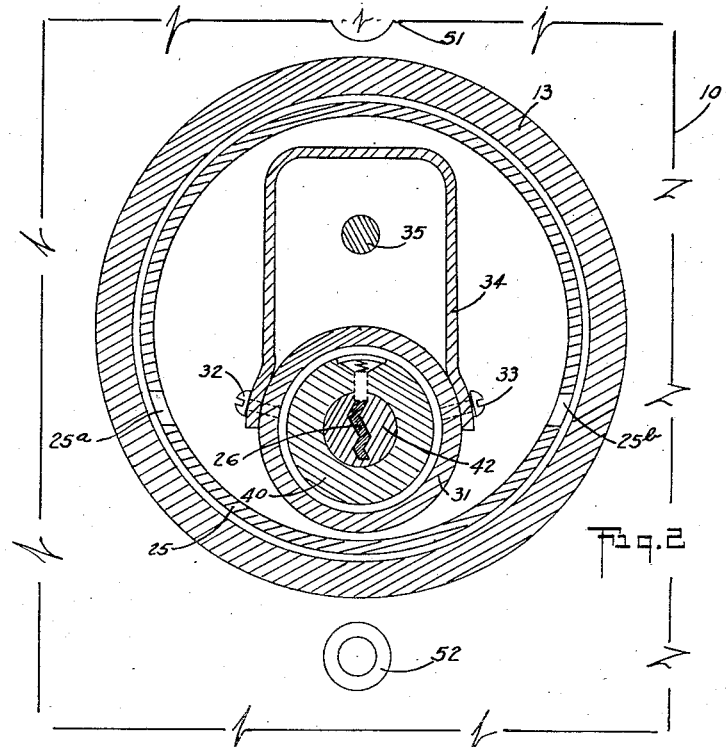
Figure 2 is a sectional view on the line 2—2 of Figure 1.

The numerals 10, 11 denote parallel plates or portions of a framework, usually the framework of a machine with which the instrument 12 is to be associated. The members 10, 11 may be connected by the cylindrical casing 13 and this casing may be attached to, or form part of, either 10 or 11, or be cast integrally therewith. Where the front plate 10 is separate from the rear plate 11 the casing 13 preferably forms part of the latter or is secured thereto.

Figure 4:
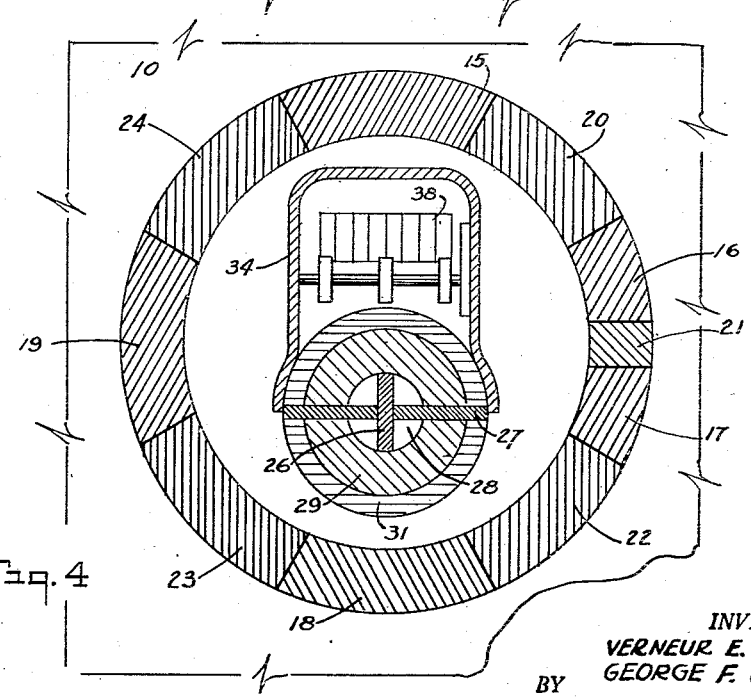
Figure 4 is a sectional view through the first-engaging portions of the removable unit on the line 4, 4, Figure 1, and the frame on which it is mounted.

The removable instrument unit includes a front plate 14 having a rearwardly extending set of lands 15, 16, 17, 18, 19, as more fully shown in Figure 4, which fit into corresponding grooves in the outer surface of the plate 10, which also has forwardly extending lands 20, 21, 22, 23, 24, lying between the lands on the plate 14. Thus the first-engaging surfaces of the unit and its support are provided with lands and grooves that not only prevent rotation of the unit when in place, as shown in Figure 1, but also prevent the use of a unit not having the proper matching lands or lugs. This configuration of the matching parts—which can be varied within wide limits—also makes it difficult to make a front like 14 in order to mount a false control key therein to operate the device. One of the objects of the invention is to make such a substitution as difficult as possible.

The front plate 14 has a rearwardly extending cylindrical sleeve 25 which may be of any suitable length to enclose and surround the instrument 12 and the locking mechanism to be presently described.

That member of the locking mechanism which is associated with the removable unit may comprise a key-like member 26 welded or secured by cross pin 27 to the shaft 28 held in plate 14 by collar 29 and handle 30.

A sleeve 31 is also welded or pinned to collar 29 and extends rearwardly, as shown in Figure 1, until it almost touches the plate 11 of the frame.

The instrument 12 is mounted in the unit in any suitable manner, such as by screws 32, 33, passing through the casing 34 of the instrument, which casing supports the parts thereof.

Means for operating the instrument, such as shaft 35, extends rearwardly therefrom. A detachable coupling 36 is interposed between the instrument shaft 35 and its driving shaft 37, the latter being mounted on plate 11 or some other stationary part of the machine.

Obviously, in the case of an electrically operated instrument the "operating means" therefore, instead of being the shaft 35, may be one or more wires—and the "detachable coupling" 36 then becomes quick detachable electrical connections of the plug-in variety. As such connections are well known, they are not here described in detail, it being sufficient to point out that the "means" for operating the instrument 12 will depend upon the type of instrument used, and that the continuity of said means is made and broken when the unit carrying the instrument is inserted and withdrawn from the supporting frame.

The shaft 35 drives suitable mechanism in the instrument 12 and the indicating dial or dials 38 thereof are visible through the glass 39 mounted in any suitable manner in the plate 14.

Now by referring to Figure 1 it will be seen that if the unit is removed from the frame that coupling 36 will separate, permitting its withdrawal, and when so withdrawn, the instrument 12 is still totally enclosed and inaccessible, as seals may be applied through holes 25a, 25b in sleeve 25 over screws 32, 33 so that any attempt to remove casing 34 is easily detected. It will be understood that shaft 35 will only operate the instrument in one direction—additively—so that the instrument cannot be reset or turned back by revolving shaft 35 in reverse.

Also, when the unit is removed, key 26 is located in a well or pocket formed by the tube 31, and, as it is secured in this position, it is exceedingly difficult to make a duplicate. In fact, it is practically impossible to duplicate the key without tools and skill not ordinarily possessed by an employee who might seek to do so.

Extending forward from the rear plate 11 or some part of the machine with which the unit is associated, is the locking member 40, in the forward end of which is positioned any suitable locking mechanism (some of which is indicated at 41) and this is adapted to be operated by key 26.

Entirely surrounded by the member 40 so as to be inaccessible, is the control member or shaft 42 which extends forwardly supporting a portion of the lock mechanism 41 and having a keyhole for key 26.

Normally, when the unit is not in place on the frame 10, 11, the shaft 42 is locked to the member 40. A collar 43 and pins shown in dotted lines at 44 hold the shaft 42 from longitudinal motion but permit it to be rotated by key 26 when the lock is operated thereby in the usual manner, whereupon the inner end of shaft 42 may, by pin 45 or any other suitable means, operate electrical or mechanical means to control a machine, valve, circuit or the like. Such a means may be a control switch, as shown diagrammatically at 46 which may control the driving motor of a machine. At the same time, the operation of shaft 42 may move some mechanical element, such as a rod 47 to mechanically enable and disable a machine, valve or the like.

The machine controls of any nature are located in a chamber or compartment 48, the cover or door 49 of which is locked or sealed, as by seals 50.

The unit may be locked to the plate 10 by locks 51, 52, mounted on front plate 14 of the unit or in any other suitable manner. By moving handle 30 to the "off" position the lock inside the unit can be operated and the machine controlled without removing the unit, so the latter can be used as a main switch or control if desired. But the machine so controlled cannot be operated without the unit being in place, for the inside lock is so arranged that the unit cannot be withdrawn along with key 26 except the latter is in the "off" position.

When a unit is unlocked at 51, 52, and handle 30 is on "off" position, the unit may be withdrawn from frame 10, 11 and the associated machine will be disabled until it or a similar unit is replaced in the frame.

The invention, therefore, permits the lessee of a machine to have two or more instrument units for each machine furnished by the lessor, and to return these units to the lessor for resetting of the counters, necessary repairs, et cetera. The lessor is assured that it is very difficult, if not impossible, to operate the machine without the unit, and the lessee is relieved of all responsibility as to correct readings of the counters, etc., as his connection with the functioning of the unit is to merely lock it in place at 51, 52, and turn handle 30 to the "on" position.

The combination of the enclosed and sealed instrument 12, the enclosed key 26, the lands and grooves in the first-engaging portion of the unit and frame, and the general difficulty of surreptitiously duplicating the unit, discourages efforts to duplicate it. This is particularly true of control key 26. It is not readily accessible for duplication, as is the case with keys that can be carried in the pocket, which can be duplicated and the original replaced.

As a check-up on the number of times the units are removed and replaced, a counter 53 is mounted in the sealed compartment 48 and has a finger 54 which contacts a part, such as 25 of the unit, to register each time the unit is replaced and restored. This counter 53 is not operated when handle 39 is used to control the machine, but only when the unit is actually taken off the machine and replaced thereon.

What is claimed is:

1. In a device of the character described, a support, an indicating instrument, a stationary casing secured to and surrounding said instrument, a key-like member secured within said casing, a lock secured to said support and adapted to be engaged by said key-like member and operated thereby, and connecting means associated with said support and instrument for connecting said instrument for operation when said casing is positioned on said support.

2. The combination as claimed in claim 1 wherein the casing is removably supported at its front end in said support, and where a portion of said lock adapted to be engaged and moved by said key-like member has secured thereto control means adapted to be operated by the movement thereof.

3. The combination as claimed in claim 1, including control means connected to said lock and adapted to be operated by the movement thereof to operative and non-operative positions, a handle connected to said key-like member and extending to the outside of said casing so as to be manually operable, means independent of said lock for locking said casing to said support whereby said key-like member may cooperate with said lock to hold said control means in operating and non-operating positions dependent upon the position of said handle.

4. In a device of the character described, a removable casing and a supporting frame therefor, said casing and frame having cooperating lands and grooves on first engaging portions of their bodies, an indicating instrument in said casing having means extending from the casing and adapted to be connected to operating means outside said casing, a key-like member in said casing, a handle connected to said key-like member and extending outside said casing for manual operation, a lock on said frame, means connected to said lock and movable therewith for controlling the actuation of operating means for the indicating instrument, said key-like member being adapted upon movement of said handle to move said lock member and thereby operate said control means.

5. The combination as claimed in claim 4, including means for locking said casing to said frame whereby said key-like member and said locking means cooperate to hold said control means in operating and non-operating positions dependent upon the position of said handle.

6. In a device of the character described, a removable casing and a supporting frame therefor, said casing and frame having cooperating lands and grooves on first engaging portions of their bodies, an indicating instrument in said casing having separable means extending from the casing and adapted to be connected to operating means outside said casing, a key-like member in said casing, a handle secured to said member and extending through said casing to the outside thereof for manual operation, a lock on said frame, and control means adapted to control the actuation of said operating means and connected to said lock and adapted to be moved therewith, said key-like member being adapted upon movement of said handle to move said lock and operate said control means.

7. In combination, a supporting frame, a removable casing supported in said frame, a rotatable key secured to said casing and partly surrounded thereby, a lock secured to said frame and projecting into said casing to receive said key, control means secured to said lock and extending through said frame and adapted to be actuated by the rotation of said key, an indicating instrument in said casing, and means for actuating said instrument mounted on said frame and adapted to engage said instrument when said casing is supported thereon, said instrument being disconnected from said means when said instrument is removed from said frame.

8. The combination as claimed in claim 7, including a casing into which said control means extends, and a contact device in said last named casing adapted to be operated by said control means.

9. In a device of the character described, a frame, a horizontal cylindrical casing mounted in said frame and having an open end, an indicating instrument supported within said casing and having a dial forming part of the front thereof, means associated with said frame and adapted to operate said instrument when the same is in said frame and separable from said instrument so as to render same inoperative when said instrument is removed from said frame together with said casing, a key secured within said casing and extending horizontally therein towards the open end thereof, a lock supported on said frame extending horizontally into said casing and adapted to be engaged by said key, and control means connected to said lock and movable therewith when same is moved by said key.

10. In combination, a frame, a member supported thereby, an instrument carried by said member, means for operating said instrument associated with said frame and adapted to operate said instrument when same is positioned in said frame and to render said instrument inoperative when the same is removed from said frame together with said member, a key secured to said member and removable from said frame therewith, a lock supported in said frame and adapted to receive said key and movable thereby, and control means connected to said lock and movable therewith to on-off positions by said key, said member, instrument and key forming a unit structure that may be operatively disassociated from said lock-frame and control device at will, as and for the purpose set forth.

VERNEUR E. PRATT.
GEORGE F. GRAY.

REFERENCES CITED

The following references are of record in the file of this patent:

UNITED STATES PATENTS

| Number | Name | Date |
| --- | --- | --- |
| 1,052,686 | Neilson | Feb. 11, 1913 |
| 1,113,785 | Hild | Oct. 13, 1914 |
| 1,196,495 | Veeder | Aug. 29, 1916 |
| 1,424,000 | Carson | July 25, 1922 |
| 1,753,734 | Andrews et al. | Apr. 28, 1930 |
| 2,125,052 | Ranson | July 26, 1938 |
| 2,333,834 | Vetter | Nov. 9, 1943 |